United States Patent [19]

Dinnis et al.

[11] Patent Number: 5,357,629
[45] Date of Patent: Oct. 18, 1994

[54] SYSTEM FOR RECORDING STRUCTURED READ ONLY DATA TABLE REVISIONS AND FORMING A DIRECTORY TO THE LATEST REVISIONS OF TABLE ELEMENTS

[75] Inventors: Richard E. Dinnis, Stratford, Conn.; Michael T. Powers, Sudbury, Mass.; William J. Ziegler, Meriden, Conn.

[73] Assignee: Pitney Bowes Inc., Stamford, Conn.

[21] Appl. No.: 760,638

[22] Filed: Sep. 16, 1991

[51] Int. Cl.⁵ .............................................. G06F 15/40
[52] U.S. Cl. .................. 395/600; 364/419.08; 364/DIG. 1; 364/222.81; 364/246.3; 364/282.1; 364/282.3; 395/400; 395/700
[58] Field of Search ..................... 395/600, 400, 700; 364/419.08

[56] References Cited

U.S. PATENT DOCUMENTS

| | | | |
|---|---|---|---|
| 4,271,481 | 6/1981 | Check et al. | 364/464.02 |
| 4,481,587 | 11/1984 | Daniels, Jr. | 364/464.03 |
| 4,623,987 | 11/1986 | Soderberg et al. | 364/464.02 |
| 4,674,040 | 6/1987 | Barker et al. | 395/600 |
| 4,730,252 | 3/1988 | Bradshaw | 364/403 |
| 4,800,506 | 1/1989 | Axelrod et al. | 364/478 |
| 4,953,105 | 8/1990 | Hirata et al. | 395/149 |
| 4,953,122 | 8/1990 | Williams | 395/400 |
| 4,996,662 | 2/1991 | Cooper et al. | 395/600 |
| 5,107,423 | 4/1992 | Sasaki et al. | 364/419 |
| 5,179,703 | 1/1993 | Evans | 395/700 |
| 5,247,658 | 9/1993 | Barrett et al. | 395/600 |
| 5,276,616 | 1/1994 | Kuga et al. | 364/419.08 |

*Primary Examiner*—Thomas C. Lee
*Assistant Examiner*—Wayne Amsbury
*Attorney, Agent, or Firm*—Robert H. Whisker; Melvin J. Scolnick

[57] ABSTRACT

A method for retrieving and outputting literal strings in a data processing device. The strings are stored in the device's memory in the form of two or more tables. A directory of the tables is generated. When a literal string is needed, the directory is searched for an appropriate table; when an appropriate table is found, the table is searched for the needed string. When a string or table is to be corrected or superseded, a later table is stored in the memory. An updated directory is assembled. The updated directory is arranged so that the later table is searched before the corrected or superseded table.

5 Claims, 6 Drawing Sheets

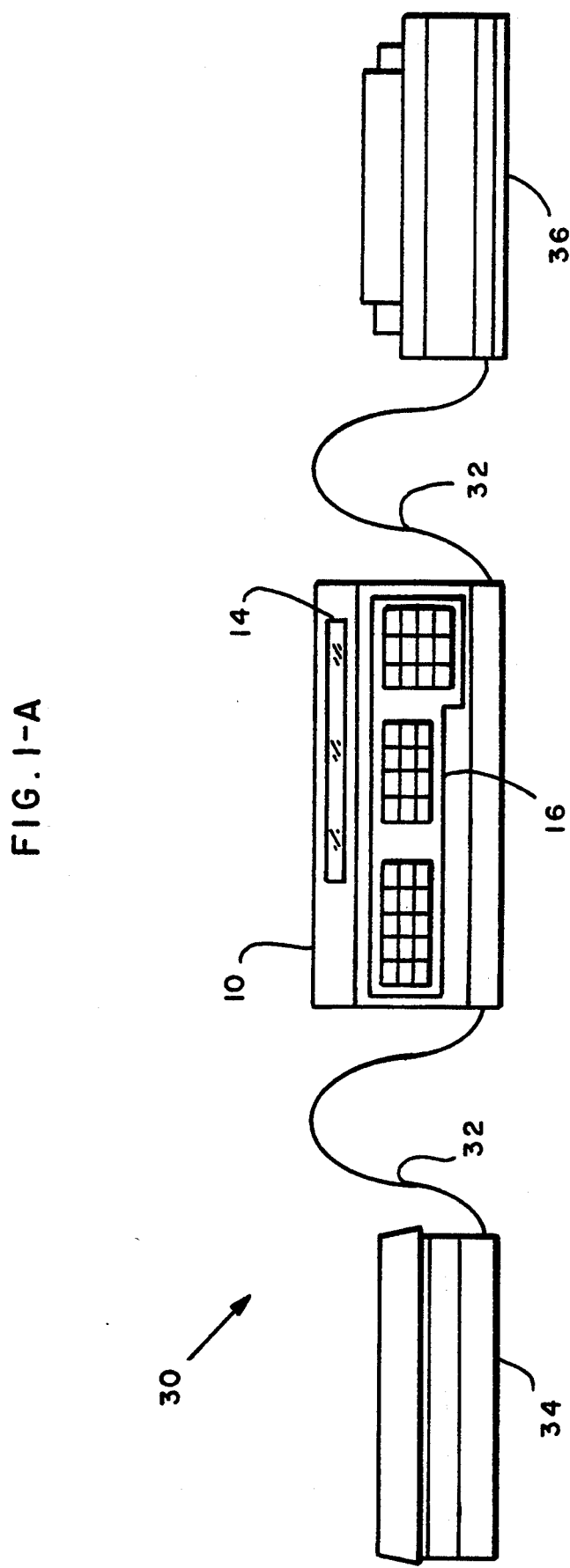

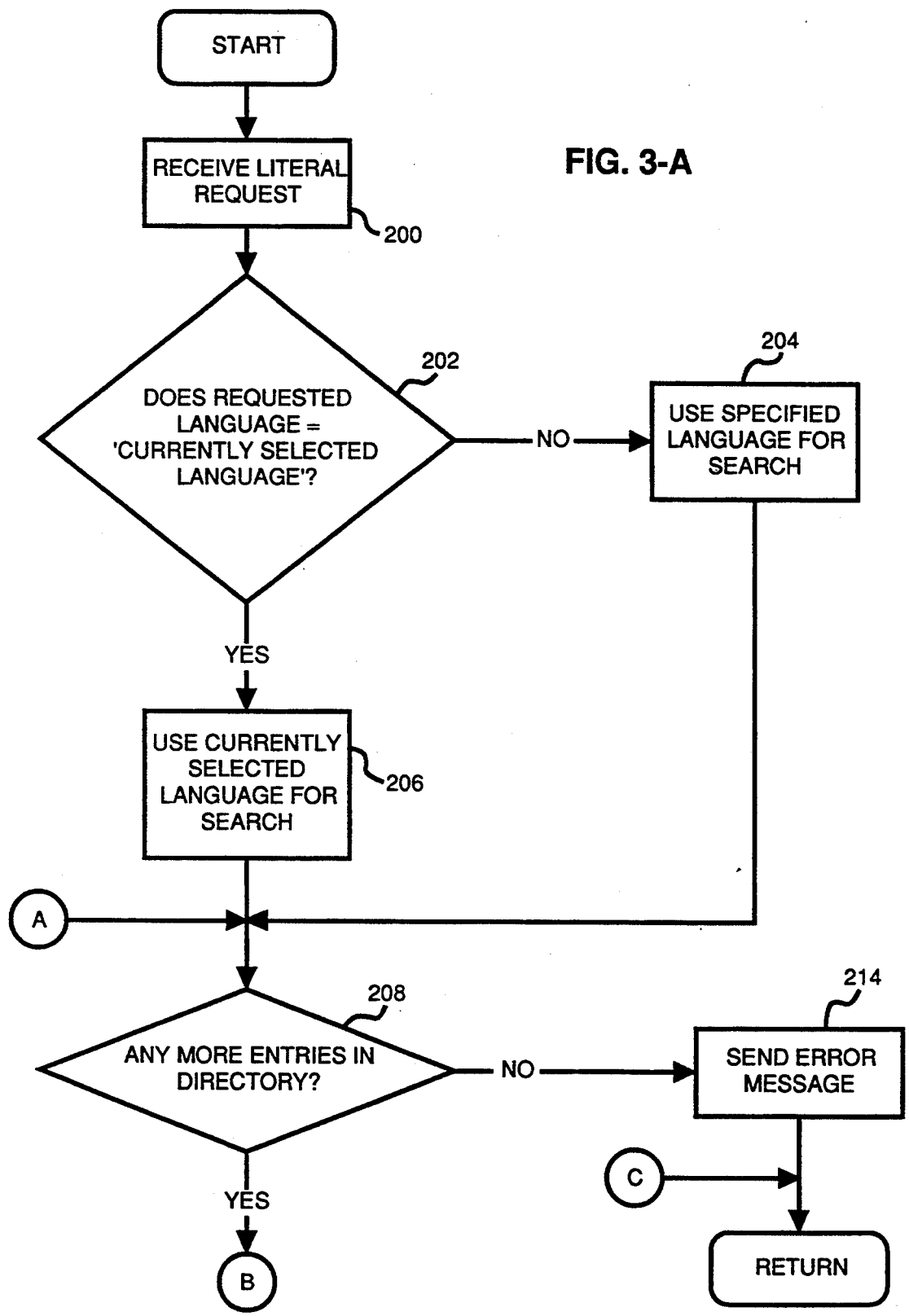
FIG. 3-A

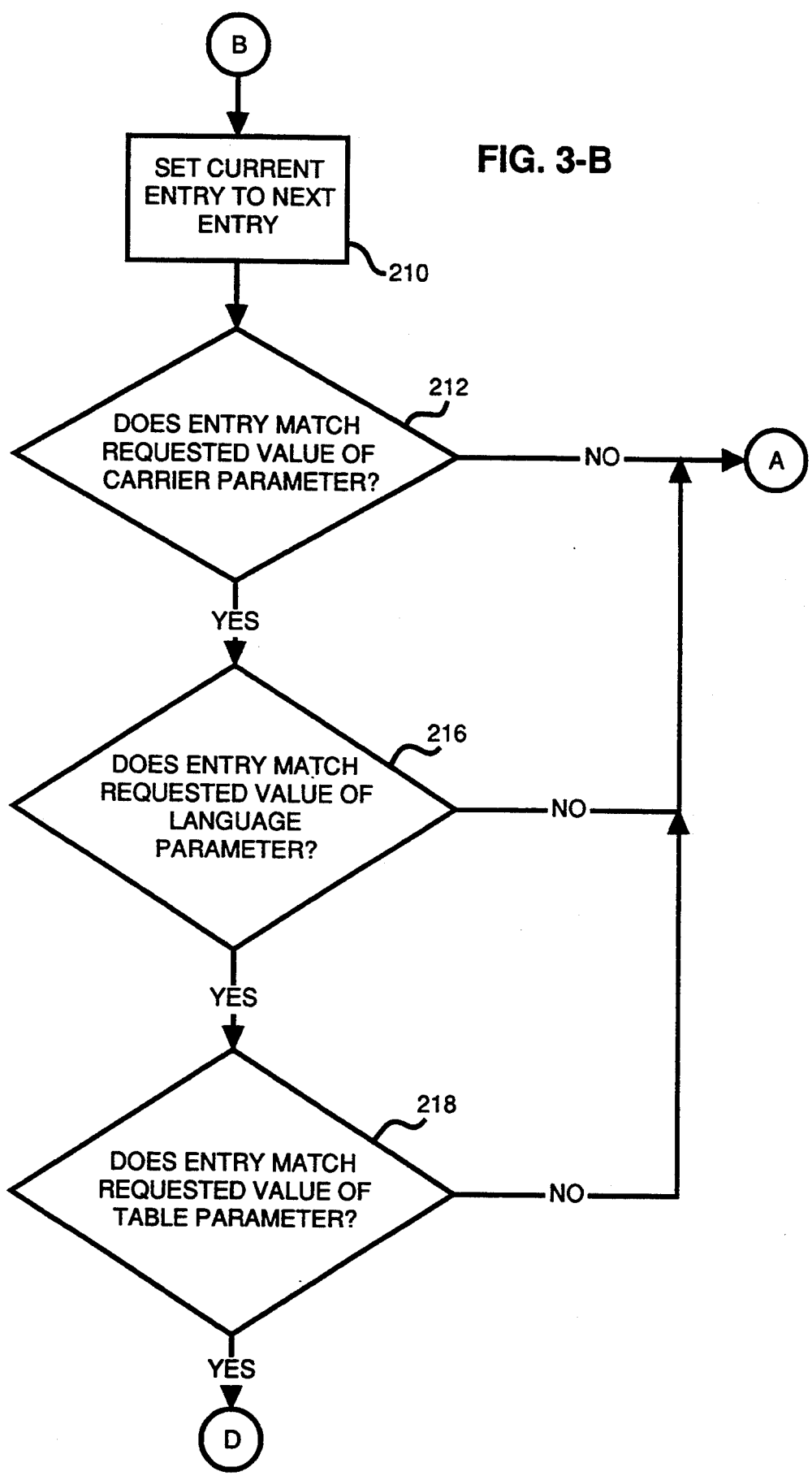

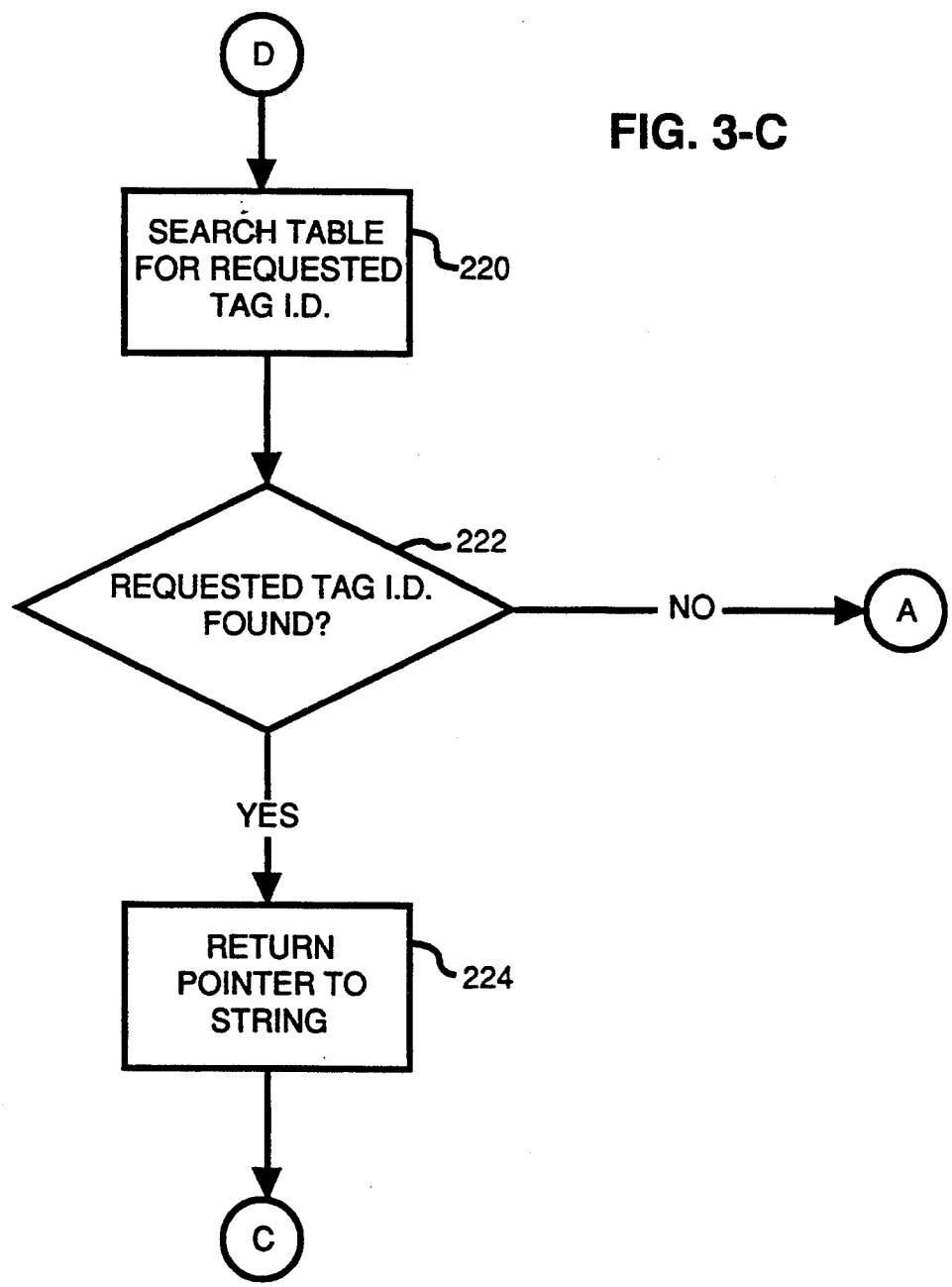
FIG. 3-C

SYSTEM FOR RECORDING STRUCTURED READ ONLY DATA TABLE REVISIONS AND FORMING A DIRECTORY TO THE LATEST REVISIONS OF TABLE ELEMENTS

RELATED APPLICATION

Reference is made to application Ser. No. 07/760,639, now pending entitled "Method of Retrieving Variable Values in a Data Processing System" assigned to the assignee of this application and filed contemporaneously with this application.

FIELD OF THE INVENTION

This invention relates to data processing devices and more particularly to such devices that output strings of alphanumeric characters.

BACKGROUND OF THE INVENTION

It is well known for a data processing device to communicate with a user of the device by output of a string of alphanumeric characters. An example of such a device is a parcel processing system of the type disclosed in U.S. Pat. Nos. 5,024,282 and 5,009,276. A parcel processing system commonly includes a display by which alphanumeric prompt messages are output to guide the user in operation of the system. Such a system also frequently includes a printer through which the system outputs reports, parcel manifests and so forth. The reports usually comprise headings, subheadings, and/or page footers that are made up of strings of alphanumeric characters. The character strings making up the prompts, headings and other texts just described are typically stored in the system's memory and accessed as needed by the system's application program. Various methods of storing the strings have been used. For example, the strings may simply by embedded at appropriate places in the program code. It is also known to store the strings separately from the code and to generate a table that identifies the address at which each string is stored. The program then refers to the table when a particular string is required to be output.

It is also known to use strings of characters to control certain operations of a data processing device. For instance, a character string may comprise a "script" that provides format and other information required for generation of a report. A character string may also constitute a series of commands that controls an operating sequence or set up of the device.

Although prior art methods have been useful for their intended purposes, it is desirable to provide more flexible methods of storing and retrieving character strings, particularly in view of the need to make changes to output texts or control strings after the device has been placed at a user's location. Such changes may include correcting of errors, adding of new functions, changing report formats or adding new reports, or increasing the number of natural languages in which the device is able to communicate with the user.

SUMMARY OF THE INVENTION

According to the invention, a method of retrieving a literal string is provided in a data processing device. The device has a memory and an output mechanism. The memory includes a plurality of locations. The method includes the steps of:

(a) storing a plurality of literal strings in the memory, each of the strings being stored in one of the locations, each of the locations having an address;

(b) storing in the memory a plurality of tables, each of the tables having data identifying some of the stored strings and addresses of the respective locations in which the strings are stored;

(c) assembling a directory of the stored tables, the directory having a plurality of entries, each of which corresponds to one of the stored tables;

(d) receiving a request to locate one of the literal strings, the request having at least one request parameter;

(e) searching the directory for an entry that matches the at least one request parameter;

(f) upon finding such an entry, searching the stored table corresponding to the matching entry for the identifying data corresponding to the requested string; and (g) upon finding the corresponding data, accessing the requested string.

According to one aspect of the invention, the entries include one or more entry parameters, the entry parameters include a version number for the corresponding tables, and the step of assembling the directory includes sorting the entries by version number.

According to a further aspect of the invention the sorting of entries is performed so that entries for more recent tables are listed earlier in the directory than less recent tables, and the searching of the directory proceeds in order through the directory, so that more recent tables are searched before less recent tables. Accordingly, a literal string may be updated or changed by storing a more recent table in the memory.

BRIEF DESCRIPTION OF THE DRAWINGS

FIG. 1-A is a semi-schematic front view of a system comprising the device of FIG. 1.

FIGS. 3-A, 3-B and 3-C are a flow chart of a routine for handling a literal string retrieval request in accordance with the invention.

DETAILED DESCRIPTION OF THE INVENTION

Figure 1:
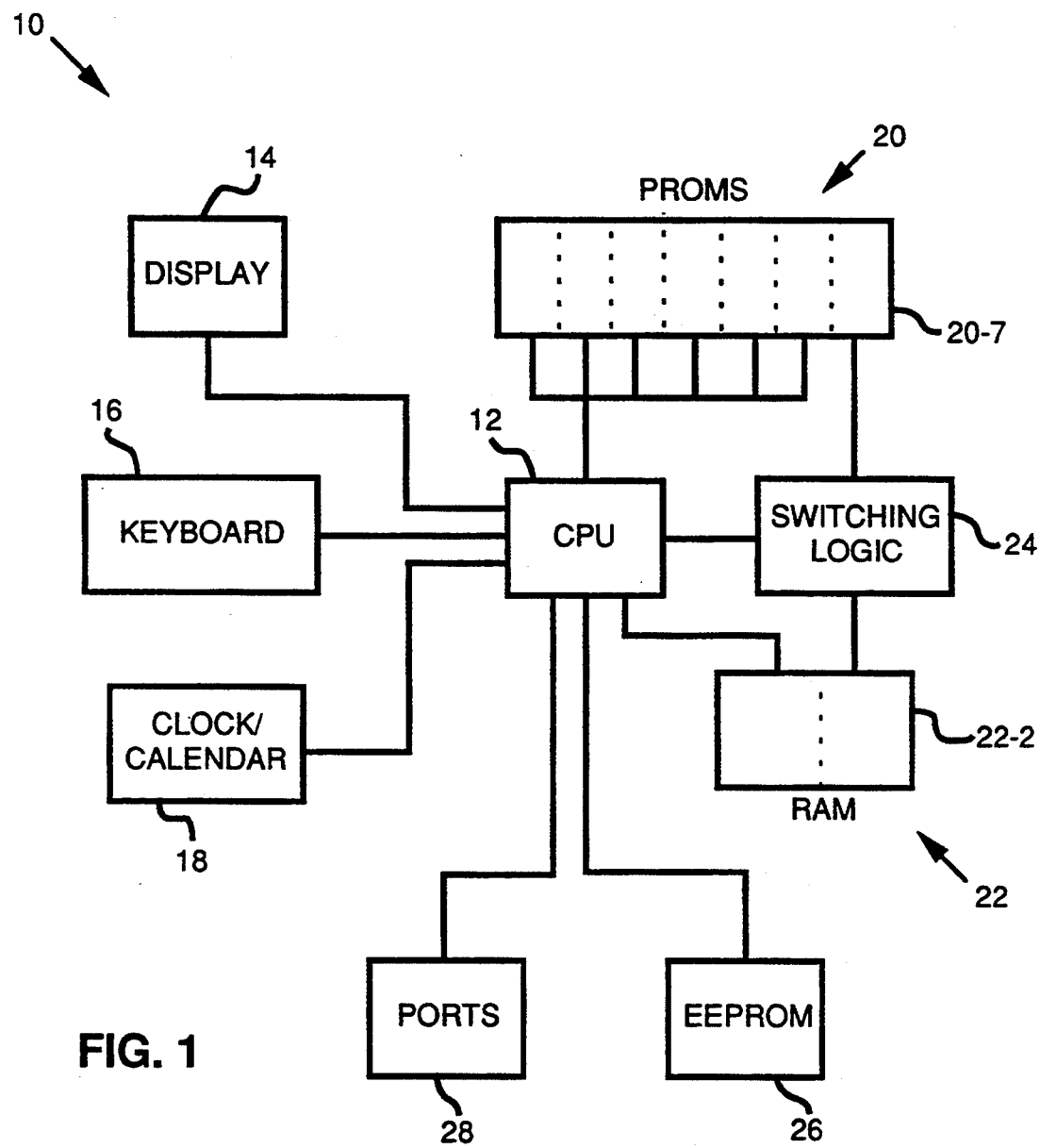
FIG. 1 is a block diagram of a device using the method of the subject invention.

Referring to FIG. 1, data processing device 10 is illustrated by means of a block diagram and preferably takes the form of a control module for a parcel processing system. Device 10 includes CPU 12, which may be an Intel model 80188 microprocessor. CPU 12 is operatively connected, via an appropriate interface, to display 14, which is preferably a conventional bit-mapped liquid crystal display. Other types of displays may also be used.

CPU 12 is also operatively connected, by means of an appropriate interface, to keyboard 16, which may be used, in a preferred embodiment, to enter carrier selection commands, parcel data, menu selections, and other functions associated with operation of a parcel processing system. Also operatively connected to CPU 12 is a clock/calendar module 18 which provides to CPU 12 signals indicative of the current date and time.

Memory elements addressable by CPU 12 include PROMS 20, which preferably include fourteen PROMS, each having a capacity of 64K bytes and mounted two each on seven PROM paddles that are detachably connected to device 10 by conventional means.

PROMS 20 store the object code for the device's operating system and also for the application program that causes the device to perform its desired functions. Also typically stored in PROMS 20 are rate tables for one or more parcel carriers, zip to zone conversion data, and a directory of the system functions available to the user.

Alternatively, some of the data, such as the directory and the zip to zone data, may be downloaded to RAM 22 from a PROM 20 that is subsequently detached from device 10.

RAM 22 is also addressable by CPU 12 and preferably comprises two b 128K battery-backed-up CMOS RAM devices. Of these, 128K RAM device 22-2 is connected to CPU 12 through switching logic device 24. Switching logic 24 also connects CPU 12 to two PROMS 20-7 mounted on the seventh PROM paddle. Switching logic 24 allows RAM 22-2 and PROMS 20-7 to share the same 128K of CPU 12's address space, thereby making accommodation to the limited address space available to CPU 12.

EEPROM 26 is also operatively connected to, and addressable by, CPU 12. EEPROM 26 may be used to store such data as a device serial number, or user passwords and, if device 10 is used as a parcel register, accounting data such as an ascending or descending register.

It will be appreciated that device 10 may alternatively be designed with larger or smaller quantities of memory elements and that the memory elements may be configured in a variety of ways, and that the proportions of RAM, PROMS and EEPROMS may be varied and that some of the memory elements may be dispensed with entirely. It will also be appreciated that switching logic 24 may also be dispensed with if 1024K or less of memory is to be addressed or if CPU 12 is capable of addressing a larger memory space.

Communication ports 28 are also operatively connected to CPU 12. Ports 28 may be used for communication between data processing device 10 and peripheral devices. Ports 28 preferably include an Echoplex port for communication with a postage meter (see U.S. Pat. No. 4,301,507 for a description of Echoplex communication), a parallel port for communication with a line printer, a serial port for communication with a label printer, and a second serial port for communication with a scale. Ports 28 may also be used for communication with other peripheral devices or with other data processing systems.

Referring now to FIG. 1-A, a parcel processing system 30 is shown in schematic form. System 30 includes data processing device 10, which includes display 14 and keyboard 16 and which is connected via appropriate cabling 32 to platform scale 34 and line printer 36. Scale 34 weighs a parcel that is to be shipped and transmits weight data to device 10. Device 10 uses the weight data to calculate a shipping charge for the parcel.

Printer 36 may be used to print, for example, manifests that are submitted to a parcel carrier along with a group of parcels that are to be shipped via the carrier. As another example, printer 36 may print reports summarizing shipping activities performed by system 30. Also, as is known to those skilled in the art, printer 36 may be of the type that is adaptable to printing labels as well as reports.

System 30 may also include other peripherals, which are not shown, such as a postage meter, a bar code scanner, and one or more additional printers.

Although device 10 is shown as a separately housed control module for system 30, it is of course possible to physically integrate some or all of the components of a parcel processing system. For example, it is well known to combine a scale and control module in a single housing. It is within the contemplation of the invention to use the method disclosed herein in such integrated hardware.

Turning now from an overview of system 30 and device 10 to particulars of information stored in PROMS 20, it will be understood that PROMS 20 store the object code for the device's operating system and also for the application program that causes the device to perform its desired functions. Also typically stored in PROMS 20 are rate tables for one or more parcel carriers, zip to zone conversion data, and a directory of the system functions available to the user. It has also been known to store, in various forms, literal character strings to be used in generating (a) prompt messages, error messages and other texts to be displayed on display 14 and (b) headings and other texts that make up part of reports to be printed by printer 36.

According to the invention, the literal strings needed by system 30 are stored in the form of tables in PROMS 20. These tables will sometimes be referred to as "literal tables". As illustrated in the following chart, each table consists of three parts: a header, a sequence of string locating data pairs, and then the literal strings themselves.

```
            HEADER
            *******
            TAG I.D.
            OFFSET
            TAG I.D.
            OFFSET
               .
               .
               .
            TAG I.D.
            OFFSET
            *******
            [string 1]
            [string 2]
            [string N]
            *******
```

The table header is at the beginning of the table and serves to identify the table. Typically the header includes the following parameters: TABLE I.D.; CARRIER; LANGUAGE; REVISION NO. It will be understood that each of these parameters may simply be a code number, such as a two-digit hexadecimal integer, that represents a certain value of the parameter. Typically values of the 'TABLE I.D.' could be 'error messages ' 'report headers ' 'system prompts ' etc., each represented by a different code number.

Similarly, for the 'CARRIER' parameter, '01' may represent the U.S. Postal Service, '02' may represent United Parcel Service, '03' may represent Airborne Express, and so forth. Preferably the last code; 'FF' is reserved for 'carrier independent' as will be explained in more detail below.

For the 'LANGUAGE' parameter, '01' may represent 'English' '02' may represent 'French' '03 may represent ' Spanish ' and so forth. As before 'FF' is reserved for 'language independent' as will be explained below.

The 'REVISION NO.' parameter is simply a number that indicates the version or revision number of the table. As will be discussed below, the revision number will be assigned in the order of issuance, e.g., '00', '01' and so forth, or date stamped, such as '910515' '911010', etc., or time stamped.

As will be appreciated by those skilled in the art, all headers may contain or start with a particular character or sequence of characters that identifies the header as a literal table header.

Following the header are data pairs. There is one data pair for each string stored in the third part of the table. Each data pair consists of a 'TAG I.D.' that identifies the corresponding string and an offset, which is a number from which may be calculated the address or location of the corresponding string's location. As will be understood by those skilled in the art, there are a number of possible offset conventions. In a preferred approach to the invention, the offset is a number which, when added to the address of the first memory location after the header (i.e. the location of the first 'TAG I.D. '), yields the address of the memory location in which is stored the first character of the corresponding string.

As may be inferred from the foregoing, the literal strings corresponding to the data pairs are stored one after the other immediately following the last data pair. Preferably the end of each string is marked by a delimiting character. As will be well understood by those skilled in the art, each string is stored in a memory location, or, more precisely, in a series of memory locations equal in number to the number of characters in the string (including the delimiting character). As is also well understood, each memory location has associated with it an address, and each string may be accessed by means of the address of the memory location in which the first character of the string is stored. It may therefore be said that each string is stored in a memory location and that each memory location has an address, which is in effect the address of the first character's location.

While the literal table structure as just described is preferred since it preserves flexibility in the use of PROM memory space, it will be appreciated that a variety of other structures are possible. For instance, the second item of each data pair could be the absolute address of the corresponding string rather than an offset from which the address is to be calculated. As another alternative, the string section of the table could be detached from the rest of the table and the strings stored at another location or locations in the PROM or PROMS. In this case, of course, another offset convention may be used instead of the preferred convention described above, or as just mentioned, the absolute address could be included in the data pair instead of an offset.

Figure 2:
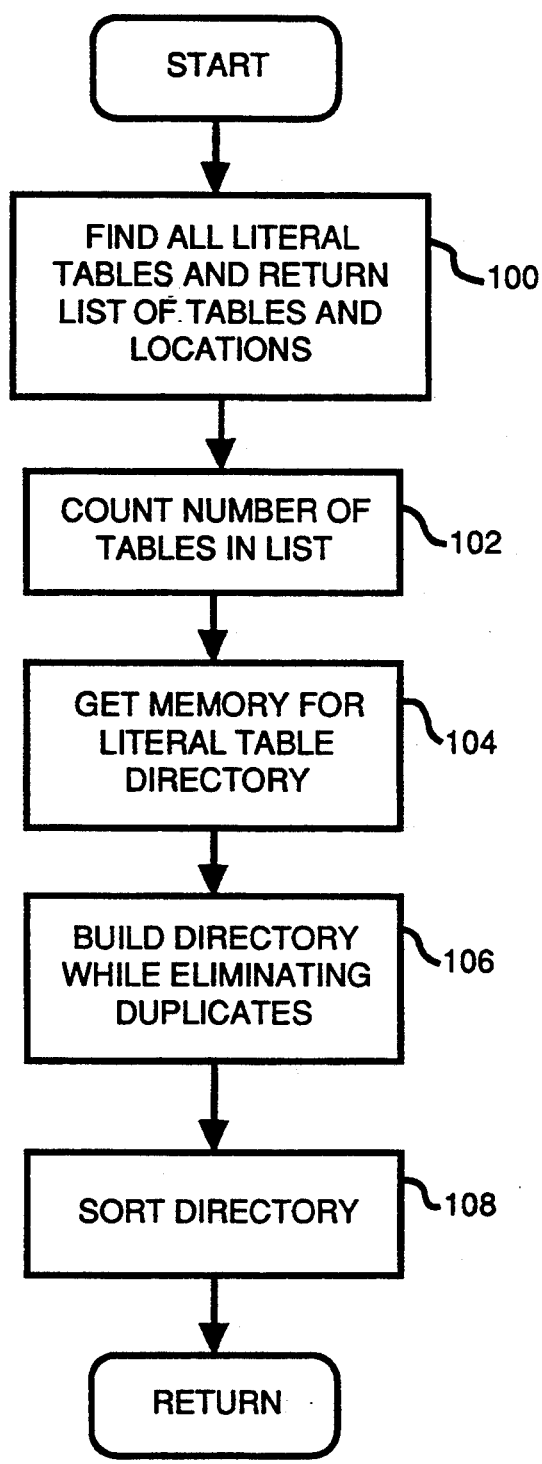
FIG. 2 is a flow chart of an initialization routine for assembling a literal table directory in accordance with the invention.

There will now be described with reference to FIG. 2 a program initialization routine in which device 10 builds and stores a directory of all literal tables stored in PROMs 20. The routine of FIG. 2 is preferably part of an initialization process that is performed each time system 30 is "powered up", i.e. turned on. Alternatively, the routine may also be performed whenever a PROM 20 is attached to or detached from device 10, if the process of detaching or attaching a PROM does not include turning the system off and on.

The routine begins with step 100, at which all of PROMS 20 are searched for literal tables and a list of the tables and their locations is returned. Next follows step 102, at which the number of tables in the list is counted. The number of tables needs to be determined in order to request the appropriate quantity of memory space for the literal table directory.

Next follows step 104, at which the required quantity of memory is requested for the literal table directory.

Step 106 follows step 104. At step 106 the directory is built while eliminating duplicate entries. It will be understood that duplicates can be eliminated by comparing each entry against every entry that has previously been added to the directory and not adding the current entry if it duplicates a preceding entry.

It should be noted that each entry includes the parameters of the heading of the corresponding table (e.g. TABLE I.D.; CARRIER; LANGUAGE; REVISION NO. ) plus the location of the corresponding table.

Step 108 follows step 106. At step 108 the directory is sorted. Preferably the entries are sorted according to three criteria. The first criterion is the value of the 'CARRIER' parameter. The second criterion is the value of the 'LANGUAGE' parameter and the third criterion is the value of the 'REVISION NO.' parameter. It will be appreciated that both the entries parameters may be sorted in accordance with the hexadecimal number value of the parameter for each entry, which will cause in each case the 'FF' entries to be sorted to the end. Thus the 'carrier independent' or 'language independent' table entries will follow the entries that are specific to a carrier or a language. As to the sortation of revision numbers, the sortation scheme is such that the most recently revised and issued tables will appear in the directory ahead of less recent tables. This may be done by issuing ascending revision numbers and then sorting in reverse order of revision number or by issuing 'FF' as the first number and then issuing subsequent revision numbers in descending order.

According to a preferred method of performing the invention, no sortation by 'TABLE' is required.

Upon completion of step 108 a properly sorted literal table directory has been stored in the memory, preferably in battery-backed-up RAM 22, of device 10. The routine of FIG. 2 then ends with a return to the balance of the initialization procedure.

Referring now to FIGS. 3-A, 3-B and 3-C, there will be described a program routine for using the literal table directory to respond to a literal request and output the required character string.

This routine begins at step 200 with the receipt of a literal request from one or another of the functions making up the applications program. For example, if a report is being generated, the request may be for a report heading that is needed for the report. Alternatively, if the system needs to respond to keyboard entry of data with a prompt message or an error message to be displayed on display 14, the request is for the string making up the text of the prompt message or error message.

The request as received preferably contains the following request parameters: TAG; LANGUAGE; CARRIER; TABLE; RETURN ADDRESS. It should be appreciated that, in an alternative embodiment of the invention not all of these parameters will need to be specified in every request. For instance, some reports that are printed have nothing to do with any carrier, in which case the carrier parameter may well be omitted. The TAG parameter is to identify the particular string that is required. The LANGUAGE parameter either specifies a language or, by an approriate code, indicates that the language is to be whatever language has been selected by the operator for operation of the system. The CARRIER parameter will of course be used to identify prompts that are specific to a given carrier and the TABLE parameter will, together with the TAG parameter, identify the desired tag. The RETURN ADDRESS parameter will indicate the memory location to which the pointer to the appropriate string's address is to be sent.

Following step 200 is step 202 at which it is determined whether the value of the LANGUAGE request parameter is equal to 'currently selected language'. If not, the specified value of the 'LANGUAGE' request parameter is used in searching the directory (step 204). Otherwise, the currently selected language is used as the value of the parameter for the purpose of searching the directory (step 206). Following step 206 or 204, as the case may be, is step 208, at which it is determined whether there are any more entries in the directory. If so (as would usually be the case at the first time the routine reaches step 208), step 210 follows, at which the current entry is set to be the next entry in the directory (which the first time through would be the first entry). Following step 210 is step 212, at which it is determined whether the 'CARRIER' parameter of the entry matches the requested value of the 'CARRIER' parameter. If not, the routine cycles back to step 208.

If at step 208 no more entries are found in the directory, an error message is sent (step 214) and the routine ends). If there are more entries, the routine will continue to cycle through steps 208, 210 and 212 until a match in the 'CARRIER' parameter is found. Once this occurs, step 212 is followed by step 216, at which it is determined whether the 'LANGUAGE' parameter of the entry matches the requested value of the 'LANGUAGE' parameter. If there is no match at step 216 again the routine returns to step 208. If there is a match at step 216, the routine proceeds to step 218, at which is determined whether the 'TABLE ' parameter of the directory entry matches the requested value of the 'TABLE' parameter. Again, if not the routine returns to step 208. It will be recognized that the routine will accordingly continually cycle through step 208 until a directory entry matches the requested values all three of the 'CARRIER' 'LANGUAGE' and 'TABLE' parameters or until there are no more entries in the directory. Assuming an entry matching all three parameters is found, then step 220 will follow step 218. At step 220, the table corresponding to the matching entry will be searched for the requested tag I.D.. It is then determined, at step 222, whether the requested tag I.D. is found in that table. If not, an error message is sent (step 214) and the routine ends. Otherwise, the offset that constitutes the second part of the data pair of which the requested tag I.D. is the first part is used to calculate a pointer to the desired string and that pointer is then returned to the return address specified in the request (step 224). The routine then ends.

It will be seen, then, that upon completion of step 224 the function that sent the literal request has access to the requested literal and may, as appropriate, output the literal string or use the string for control or processing purposes.

Although the implications of the routines discussed in connection with FIGS. 2, 3-A, 3-B and 3-C will generally be understood by those skilled in the art, it is worthwhile to note some of the implications in detail.

As is well known to those skilled in the art, it is frequently necessary to update the carrier rate data stored in PROMs 20 of system 30. The well known method by which this is accomplished is mailing an updated rate PROM board to the user of system 30. The user or a service representative then detaches a PROM board from device 10 and replaces it with the updated rate PROM board.

Suppose now that a typographical error is discovered in a character string stored in a literal table stored on any of PROMs 20. For purposes of illustration we will refer to that literal table as TABLE A, Rev. 1, where "TABLE A" will be understood to include all the parameters required to identify the table other than 'REVISION NO.'

If it is desired to correct the erroneous string all that is required is to include on the next rate update PROM a literal table in the following form:

---

TABLE A, REV. 2
******
TAG I.D.
OFFSET
*******

(corrected string)
******

---

(It will be assumed that no revisions to Table A have been previously issued since Rev. 1. It will also be understood that the TAG I.D. immediately following the header of TABLE A, Rev. 2 corresponds to the string that is to be corrected.)

Upon reinitialization of system 30 after installation of the update PROM, a literal table directory will be generated and stored in accordance with the routine of FIG. 2. As a result of that routine, and particularly step 108, the literal table directory will include an entry for TABLE A, REV. 2 immediately before the entry for TABLE A, REV. 1. Subsequently when the string in question is to be output, an appropriate literal request will be received (FIG. 3-A, step 200), the entry for TABLE A, REV. 2 will be matched (FIG. 3-B, steps 212, 216 and 218) and TABLE A, REV. 2 searched for the TAG I.D. corresponding to the desired string (FIG. 3-C, step 220). The TAG I.D. is then found, a pointer to the corrected string is returned, and the corrected string is then accessed and either output or interpreted for control purposes, as the case may be.

It will therefore be seen that TABLE A, REV. 2 represents a simple, effective and conveniently installed "patch" on TABLE A, REV. 1. When a request is made for a string stored in TABLE A, REV. 1 other than the corrected string, the corresponding TAG I.D. will not be found in TABLE A, REV. 2 and the retrieval routine will cycle through steps 208, 210 212,216 and 218. TABLE A, REV. 1 will then be found to match the request and the requested string will be retrieved and accessed, etc.

While a rather modest example has just been given, it will be appreciated that much more complex and extensive changes to literal strings can readily be made via new literal tables on update PROMs with little or no need to change the system's application program. For example, if a parcel carrier changes the required format of manifests, many or all of the changes can be implemented via a new literal table containing updated character and/or format command strings. As another example, the natural languages in which output literals are expressed can readily be changed or augmented with little or no change to the application program. As still another example, strings required by new functions can easily be added via new literal tables.

Although the inventive method as described herein has included references to memory space realized in detachable PROM boards, it is also within the contemplation of this invention to use the inventive method in devices without PROMs and in devices in which data storage and/or updating is accomplished via floppy disk, data communication, keyboard input, optical character or data code reading and by other means. Accordingly, as used in the claims, "address" shall be construed to refer to a conventional RAM or ROM address and also to a code or number that denotes a specific location in a fixed or floppy disk or other storage device. It will also be apparent that variations and modifications may be made in the subject invention and it is therefore intended in the following claims to cover each such variation and modification as falls within the true spirit and scope of the invention.

What is claimed is:

1. In a data processing device having a first read only memory and a random access memory and output means, a method of retrieving a literal string selected from a plurality of literal strings stored in said first memory comprising the steps of:
   a) storing a plurality of literal tables in said first memory, each table of said plurality of literal tables comprising:
      a1) at least one of said literal strings
      a2) a sequence of string locating data elements, each of said data elements comprising a tag I.D. identifying a literal string comprised in said table and address information for enabling said data processing device to retrieve said identified literal string; and
      a3) a header, comprising a set of identification parameters for identifying said table, and a revision number, said revision number identifying said table as comprising a particular revision of lateral tables having an identical set of identification parameters.
   b) assembling a directory of said literal tables, said directory comprising groups of entries corresponding to literal tables having an identical set of identification parameters in said random access memory, said entries being ordered within said groups in accordance with said revision numbers, each of said entries including address information enabling said data processing device to access said corresponding literal tables;
   c) receiving a request to retrieve a selected literal string, said request including a specified set of identification parameters and a tag I.D. for said selected literal string;
   d) accessing one of said groups in said directory corresponding to said specified set of identification parameters and accessing an entry in said one group corresponding to the most recent revision of literal tables having said specified set of identification parameters;
   e) accessing said address information in said entry corresponding to said most recent revision, and then accessing said sequence of string locating data elements for one of said literal tables corresponding to said most recent revision to determine if said selected literal string is comprised in said one of said literal tables; and,
   f) if so, retrieving said selected literal string for output to said output means; and,
   g) if said selected literal string is not found repeating steps e through f for the next most recent revision level; and
   h) if said selected literal string is not found in any of said literal tables corresponding to said set of selected identification parameters, exiting to a predetermine error routine.

2. The method of claim 1 wherein said selected literal string is revised by the further steps of:
   a) preparing a replacement read only memory, said replacement memory including substantially the same data as said first read only memory and an additional revised literal table, said revised literal table having said specified set of identification parameters, and a revision number indication that said revised literal table contains a new revision level of literal tables having said specified set of identification parameters, and said revised literal table including a revised version of said selected literal string and a string locating data element, said data element including a tag I.D. identifying said selected literal string and address information for enabling said data processing device to retrieve said revised version of said identified literal string;
   b) replacing said first read only memory with said replacement read only memory; and
   c) reassembly said directory; whereby
   d) said data processing device will retrieve said revised version of said selected literal string in response to said request.

3. A method as described in claim 2 wherein said data processing device is a parcel processing systems.

4. A method as described in claim 3 wherein said identification parameters include a parameter for identifying a carrier for shipment of parcels.

5. A method as described in claim 3 wherein said identification parameters include a parameter for identifying a language in which literal strings comprised in said table are expressed.

* * * * *